United States Patent
Shae et al.

(10) Patent No.: US 8,639,638 B2
(45) Date of Patent: Jan. 28, 2014

(54) ENABLING A SUPPORT SERVICE TO PROVIDE AUTOMATED PROBLEM RESOLUTION BASED ON REAL TIME CHAT ANALYTICS

(75) Inventors: Zon-Yin Shae, South Salem, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 13/011,108

(22) Filed: Jan. 21, 2011

(65) Prior Publication Data

US 2012/0191629 A1    Jul. 26, 2012

(51) Int. Cl.
G06F 17/21    (2006.01)
(52) U.S. Cl.
USPC .......................................................... 706/11
(58) Field of Classification Search
None
See application file for complete search history.

(56) References Cited

U.S. PATENT DOCUMENTS

| | | | | |
|---|---|---|---|---|
| 2004/0236843 | A1* | 11/2004 | Wing et al. | 709/219 |
| 2006/0080130 | A1* | 4/2006 | Choksi | 705/1 |
| 2008/0118052 | A1* | 5/2008 | Houmaidi et al. | 379/265.11 |
| 2009/0077176 | A1* | 3/2009 | Shae et al. | 709/204 |
| 2009/0193123 | A1* | 7/2009 | Mitzlaff | 709/227 |
| 2009/0292778 | A1* | 11/2009 | Makar et al. | 709/206 |
| 2010/0145851 | A1* | 6/2010 | Van Rensburg et al. | 705/42 |
| 2011/0055699 | A1* | 3/2011 | Li et al. | 715/709 |
| 2011/0289076 | A1* | 11/2011 | Boyle et al. | 707/723 |
| 2012/0041903 | A1* | 2/2012 | Beilby et al. | 706/11 |

OTHER PUBLICATIONS

Goh O. et al., "Intelligent Agent Technology in E-commerce", IDEAL 2003, LNCS 2690, pp. 10-17, 2003.*
Durbin S. et al., "RightNow eService Center: Internet customer service using a self-learning knowledge base", Proceedings of the American Association for Artificial Intelligence, pp. 815-821, 2002.*
Shawar et al., "A Comparison Betweeen Alice and Elizabeth Chatbot Systems", University of Leeds School of Computing Research Report Series, Report 2002.Dec. 19, 2002, UK, pp. 1-22.
Jia, "The Study of the Application of Keywords-based Chatbot System on the Teaching of Foreign Languages", pp. 1-11, Institute for Interdisciplinary Informatics, University of Augsburg, Germany, retrieved Jan. 20, 2011 http://arxiv.org/ftp/cs/papers/0310/0310018.pdf.
Huang et al., "Extracting Chatbot Knowledge from Online Discussion Forums", IJCAI'07 Proceedings of the 20th international joint conference on Artifical intelligence, Morgan Kaufmann Publishers Inc. San Francisco, CA, USA , 2007, pp. 1-6.

* cited by examiner

*Primary Examiner* — Jeffrey A Gaffin
*Assistant Examiner* — Dave Misir
(74) *Attorney, Agent, or Firm* — Yee & Associates, P.C.; Louis J. Percello

(57) ABSTRACT

An embodiment of the invention directed to a method for resolving a problem detected in a data processing machine includes establishing a chat link between a machine user and a support service agent, for enabling a conversation therebetween. One or more initial messages sent from the user to the agent over the link is analyzed, to generate a goal associated with the detected problem. The goal is applied as an input to an AI planning component, which is operated in response to the goal to produce an initial set of actions for achieving the goal. Messages sent from the user to the agent subsequent to the initial messages are analyzed, and responsive to such analysis, the initial set of actions is selectively changed to an updated set of actions, for use in achieving the goal.

16 Claims, 3 Drawing Sheets

ENABLING A SUPPORT SERVICE TO PROVIDE AUTOMATED PROBLEM RESOLUTION BASED ON REAL TIME CHAT ANALYTICS

BACKGROUND OF THE INVENTION

1. Field

The invention disclosed and claimed herein generally pertains to a method and mechanism for enabling an online support service or the like to provide automated resolution of a problem occurring in a data processing system, wherein resolution is based on real time chat analytics. More particularly, the invention pertains to a method and mechanism of the above type, wherein chat analytics are used to determine a goal or objective and a related set of actions that could be carried out to resolve the problem.

2. Description of the Related Art

Businesses and other entities that operate computer and data processing systems frequently need assistance in correcting malfunctions and other system problems. Common sources for such assistance include online support services, which can be accessed over the Internet and/or by telephone.

In order to provide service for a particular problem, a conversation typically takes place between the system user and a support service agent. The conversation comprises an exchange of statements and responses between the user and agent, wherein respective communications may be in the form of texts, or alternatively in the form of spoken words. In some of these arrangements the agent is a human, while in other arrangements, the agent is a non-human device of some type.

As is known by those of skill in the art, a chatbot is a computer program designed to simulate an intelligent conversation with one or more human users, via auditory or textual methods. In view of these characteristics, chatbots have been used as non-human agents to provide online help. In a common mode of use, the chatbot scans for key words within an incoming message, and pulls a reply with the most matching key words, or the most similar wording pattern, from a textual database. However, in such schemes the assistance which can be provided is generally limited only to conversational activity, and to furnishing information in textual or other form to the system user who is seeking help.

SUMMARY OF THE INVENTION

In embodiments of the invention, a chat link is established between the user of a data processing system who needs help or servicing, and an agent of a support service or the like. As used in this application including the claims, the term "agent" can be, alternatively, a real agent, a software agent or a chatbot. If the user and agent engage in a conversation or chat, wherein a succession of text messages are exchanged between the user and agent over the chat link, real time text analytics are used to infer a goal from respective messages, which is pertinent to resolving the system problem. As the chat progresses, each line of the exchanged text is processed, in order to determine possible actions that could be automatically or semi-automatically executed on behalf of the user to fix the problem.

One embodiment of the invention is directed to a method for resolving a problem detected in a data processing machine operated by a user. The method includes the step of establishing a chat link between the user and an agent associated with a service support system, for enabling a conversation between the user and the agent, wherein the conversation comprises successive messages sent over the chat link between the user and the agent. The method further comprises analyzing one or more initial messages sent from the user to the agent over the chat link, to generate a goal associated with the detected problem. The goal is applied as an input to an artificial intelligence (AI) planning component, and the AI planning component is operated in response to the goal to produce an initial set of actions that are intended to achieve the goal. Messages sent from the user to the agent over the chat link subsequent to the initial messages are analyzed, and responsive to the analysis of the subsequent messages, the initial set of actions is selectively changed to an updated set of actions, for use in achieving the goal.

DETAILED DESCRIPTION OF THE PREFERRED EMBODIMENT

Figure 1:
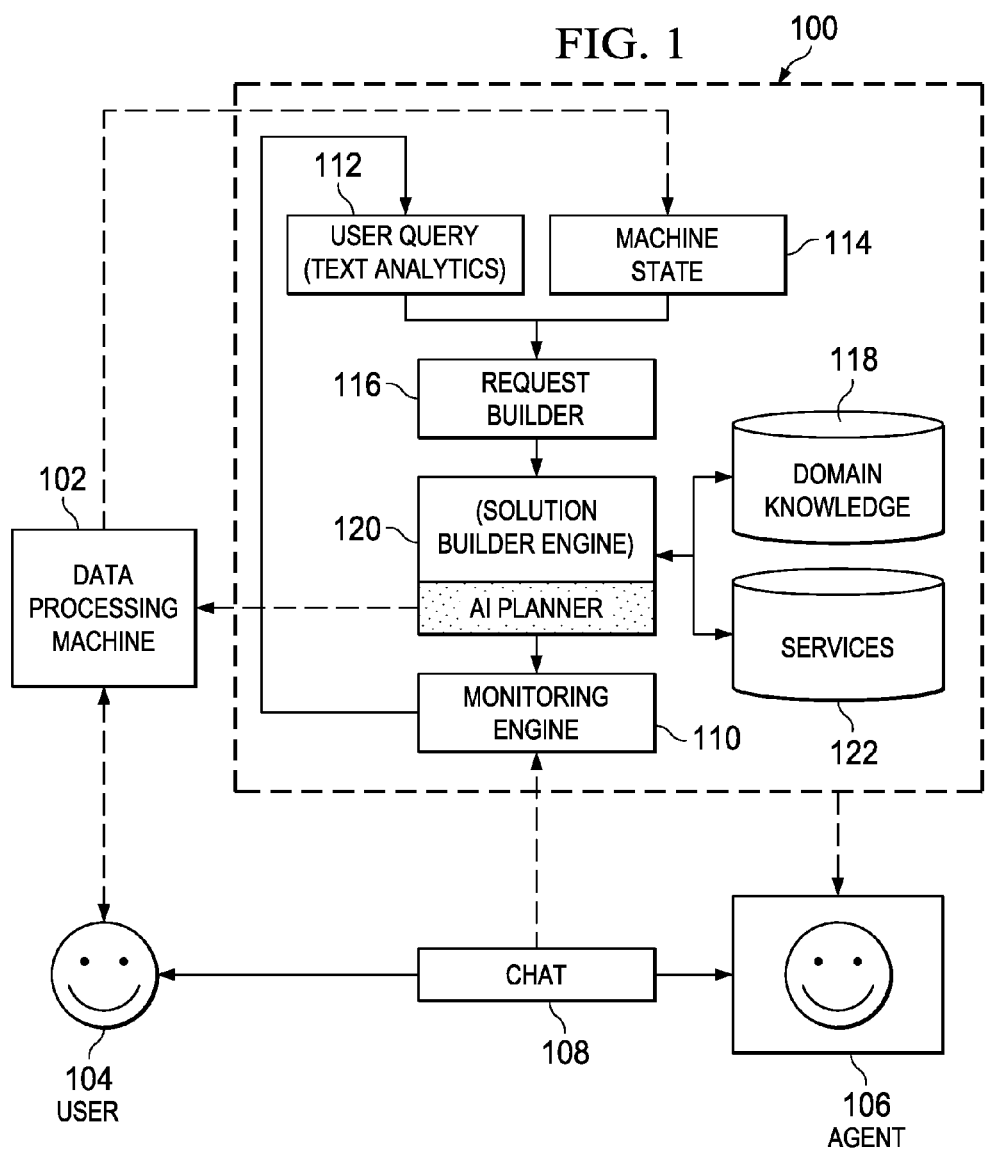
FIG. 1 is a schematic diagram showing respective components of an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a service support or problem resolution system 100, configured to fix or resolve problems that can occur in computers and data processing systems such as the data processing machine 102. Machine 102 is used or operated by a user 104. An agent 106 associated with system 100 is disposed to communicate with user 104, in regard to a problem that user 104 is having with machine 102. Agent 106 may be a human agent who is equipped to engage in a conversation or dialog. Alternatively, agent 106 could comprise a mechanism such as a chatbot. As described above, a chatbot is a computer program designed to simulate an intelligent conversation with one or more human users.

When a problem is detected in machine 102, and user 104 seeks to obtain assistance from problem resolution system 100, a first step would be to establish a chat link or communication path between user 104 and agent 106. FIG. 1 shows a chat link 108 therebetween, which could be set up over the Internet or other data processing channel. With a link of this type, the conversation or chat would comprise a stream of text messages exchanged between user 104 and agent 106.

Alternatively, chat link 108 could comprise a telephone connection or the like. In this event, the conversation would consist of audio messages in the form of human speech. If agent 106 was a non-human entity, it could be operated to generate audio messages by means of voice synthesis.

FIG. 1 further shows problem resolution system 100 provided with a monitoring engine 110. Monitoring engine 110 is connected to chat link 108, to receive each successive message sent between user 104 and operator 106 during their conversation or chat. Monitoring engine 110 is further connected to route successive received messages to user query 112. User query 112 performs the function of analyzing successive messages, in order to determine the problem or inquiry of the user which is the subject of the chat with operator 106. If the messages are in the form of text, user query 112 is provided with a text analytics capability, in order to carry out this function. As described hereinafter in further detail, the function of user query 112 may be part of a process for identifying the specific problem that user 104 has encountered with machine 102. User query 112 may also be used to acquire further information, for use in determining one or more actions that would correct the problem.

As a simplified example of the operation of user query 112, monitoring engine 110 could detect a chat message from user 106 stating that he could not get data processing machine 102 to connect to an enterprise wireless LAN (WLAN). Upon analyzing this message, user query 112 could recognize that it was important to know the particular state of machine 102. State information would include the software applications that were contained in machine 102, the applications that were currently running, and their respective versions. Accordingly, user 112 would notify a system 100 function component identified as machine state 114 to acquire the state of data processing machine 102. Machine state component 114 would then take such action.

Referring further to FIG. 1, there is shown a request builder 116 that receives inputs from both user query component 112 and machine state component 114. Request builder 116 uses these inputs to build or construct a request, wherein the request is a statement of a goal associated with a problem encountered in machine 102, and the user desires to resolve the problem. The goal statement is directed to a solution builder engine, which usefully comprises an artificial intelligence (AI) planner 120. Request builder 116 may also put the statement into a format that can be used by AI planner 120, such as STRIPS or PDDL.

In the above example, request builder 116 is furnished with the information that machine 102 cannot be connected to the wireless LAN. In view of this information, request builder 116 could specify, as a useful goal or task, correction of this situation so that machine 102 can be connected to the wireless LAN. This goal would then be delivered to AI planner 120, together with the current state information for machine 102. The machine state information would generally indicate machine type, the particular software it was using, and other pertinent properties and characteristics.

AI planner 120 may be a mechanism of a type known in the art that generally has three inputs. These include a description of the current state of an object of interest; a description of a desired goal or objective; and a set of possible actions. The planner is then operable to determine a particular set of actions that will achieve the goal. It will be seen that request builder 116, in providing a goal and a machine state as described above, supplies the first two inputs to AI planner 120.

In order to provide the third input, FIG. 1 shows a domain knowledge component 118 connected to AI planner 120, and further shows a services component 122 connected thereto. If planner 120 determines that actions to achieve the specified goal include supplying information, to a user or the like, the domain knowledge component 118 can be used as a source for such information. If it is determined that the set of actions requires performing a service on the machine 102, services component 122 can be operated to carry out such task.

For the above example, AI planner 120 could initially determine that the specified problem of machine 102, i.e. the inability to connect to the WLAN, could occur for one of a number of different reasons. Accordingly, AI planner 120 would investigate each of these possible reasons in an orderly manner, to determine which one was the cause of the problem. However, such investigations could require obtaining further information from user 104. Accordingly, as a first action in resolving the problem, AI planner 120 could direct agent 106 to take certain actions, such as asking the user to turn the wireless connection on and off, in order to see if the connection hardware was working at all. The user's comments to the agent after taking this action would be acquired by monitoring engine 110, and would be routed through user query 112 and request builder 116 to AI planner 120.

In the event the user's comments indicate that the wireless connection hardware is working properly, AI planner 120 could take the further action of directing agent 106 to ask the user 104 a number of questions pertaining to another possible cause of the problem. For example, AI planner 120 could recognize that for the type and version of the application software machine 102 was running, it is common for a known bug or defect to occur that prevents connection to a WLAN. Accordingly, agent 106 would be directed to ask the user a series of questions, such as the error message that was observed or other things that happened, whenever the wireless connection was turned on. The series of questions could be delivered to the agent, such as from the domain knowledge component 118, and the agent would be prompted to ask the questions. The user's response to each of these questions would be received by monitoring engine 110 and routed to AI planner 120. Thus, information for use in resolving the problem of machine 102 would be continually acquired, during the chat between user 104 and agent 106.

If the user's response to the questions indicated that the known bug is in fact present in the software of machine 102, AI planner 120 would need to take action to correct this situation. In a useful embodiment, a patch or software update for eliminating the bug would be available to the services component 122 of problem resolution system 100. AI planner 120 could then direct services component 122 to automatically install the update into the software of data processing machine 102. The problem of machine 102 would thereby be automatically corrected by system 100, as a result of the chat between user 104 and agent 106, and the chat analysis.

The monitoring engine may also observe changes to machine 102 during execution of corrective services, and estimate the distance of the machine state from the intended goal.

As a further example of the operation of problem resolution system 100, some of the questions asked by agent 106 and responded to by user 104 could indicate that a password was required for connection to the WLAN, and could further indicate that the password had expired. Upon recognizing this situation as being the cause of the problem, AI planner 120 could direct agent 106 to furnish user 104 with a URL and instructions for obtaining a valid password. Alternatively, AI planner 120 could direct system 100 to automatically assist user 104 in acquiring a valid password.

Figure 2:
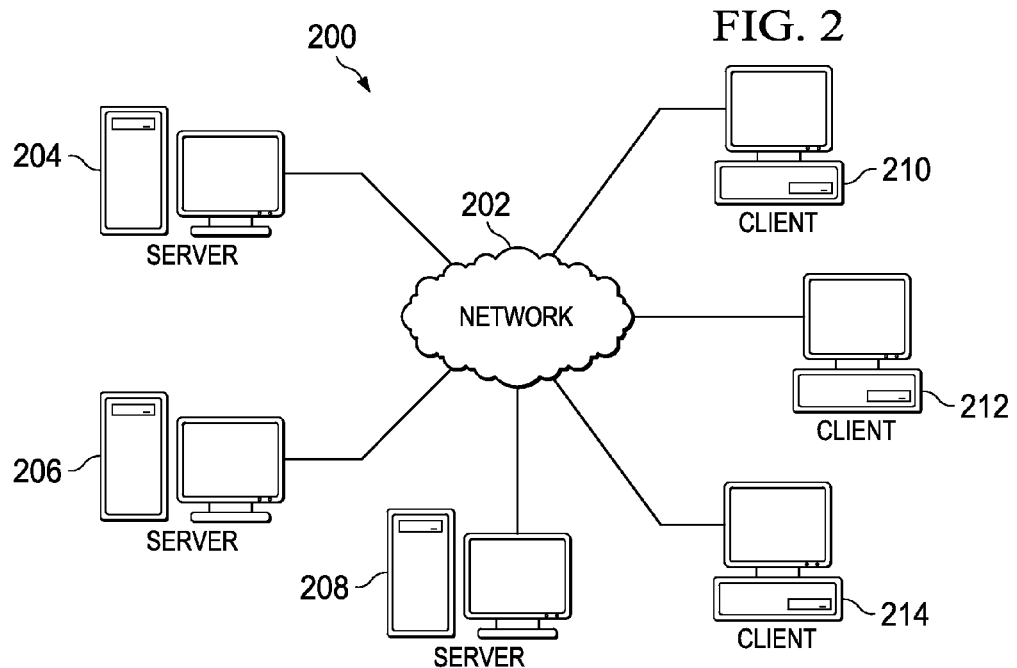
FIG. 2 is a block diagram showing a system network in which embodiments of the invention may be implemented.

Referring to FIG. 2, there is shown a block diagram of a systems network 200, comprising data processing systems in which embodiments of the present invention may be implemented. Systems network 200 is a network of computers and other components that includes network 202, the medium used to provide communication links between various devices and computers connected together within systems network 200. Network 202 may include connections such as wire, wireless communication links, or fiber optic cables.

Components of systems network 200 further include servers exemplified by servers 204-208, and clients exemplified by clients 210-214. Data processing machine 102 of FIG. 1 could, for example, comprise client 210, and problem resolution system 100 of FIG. 1 could comprise server 204.

In the depicted example, network 202 of systems network 200 could be the Internet, including a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. FIG. 2 is intended as an example, and not as an architectural limitation, for different embodiments of the present invention.

Figure 3:
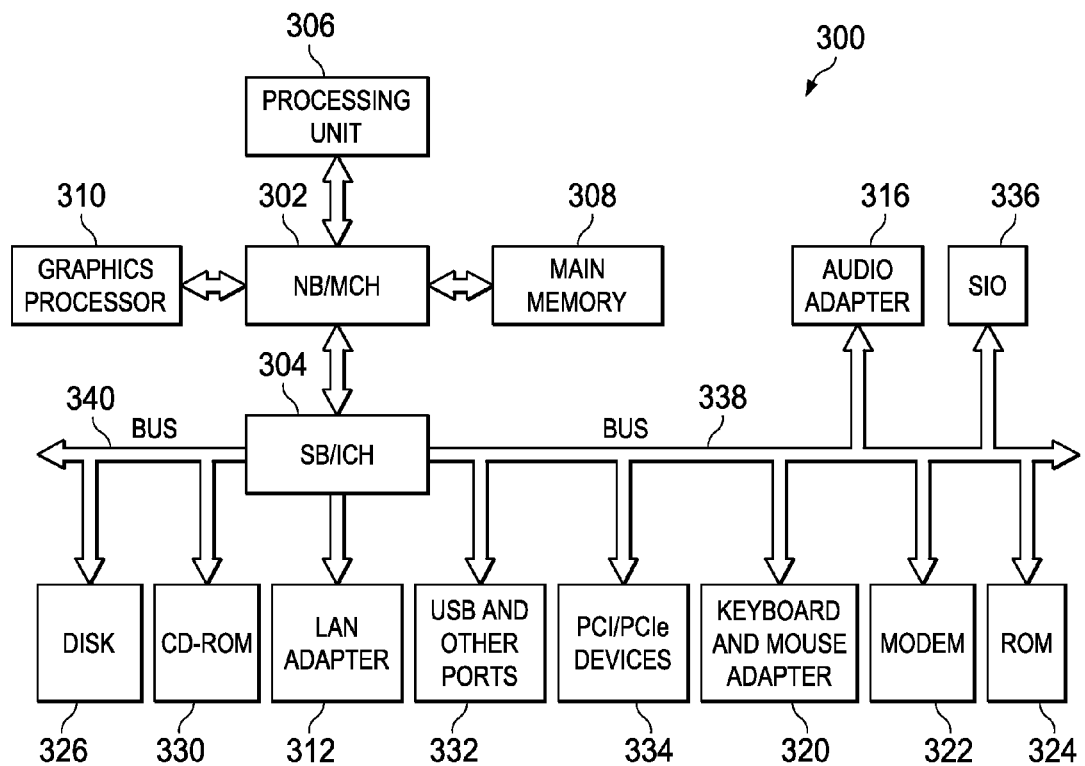
FIG. 3 is a block diagram showing a data processing system which may be used in implementing embodiments of the invention.

With reference now to FIG. 3, a block diagram of a data processing system 300 is shown in which aspects of the present invention may be implemented. Data processing system 300 is an example of a computer, such as server 204 or client 210 in FIG. 2, in which computer usable code or instructions implementing the processes for embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306 and coordinates and provides control of various components within data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for embodiments of the present invention are performed by processing unit 306 using computer usable program code, which may be located in a memory such as, for example, main memory 308, ROM 324, or in one or more peripheral devices 326 and 330.

In some illustrative examples, data processing system 300 may be a personal digital assistant (PDA), which is configured with flash memory to provide non-volatile memory for storing operating system files and/or user-generated data.

A bus system may be comprised of one or more buses, such as bus 338 or bus 340 as shown in FIG. 3. Of course, the bus system may be implemented using any type of communication fabric or architecture that provides for a transfer of data between different components or devices attached to the fabric or architecture. A communication unit may include one or more devices used to transmit and receive data, such as modem 322 or network adapter 312 of FIG. 3. A memory may be, for example, main memory 308, ROM 324, or a cache such as found in NB/MCH 302 in FIG. 3.

Figure 4:
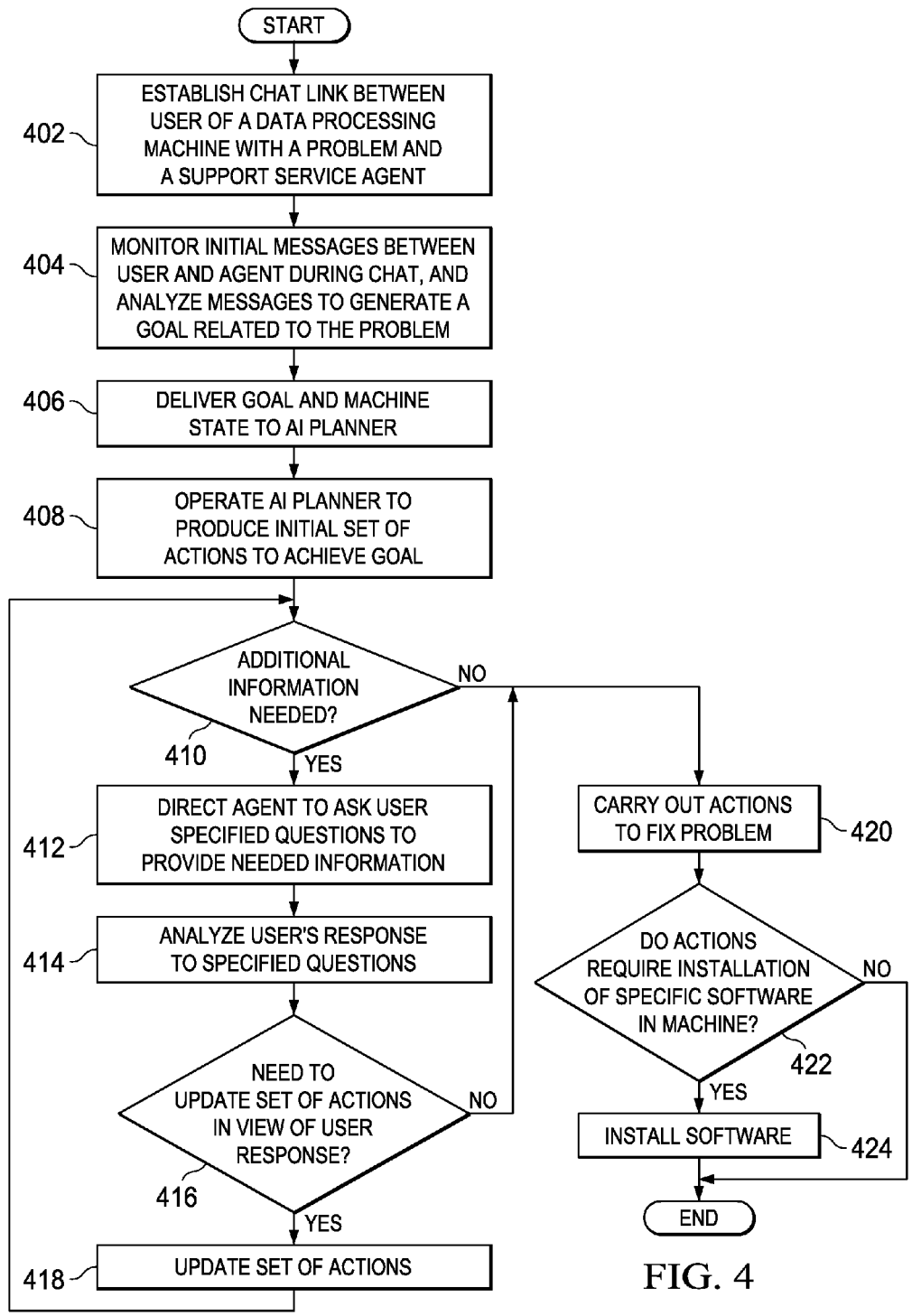
FIG. 4 is a flowchart showing steps for a method comprising an embodiment of the invention.

Referring to FIG. 4, there are shown steps of a method comprising an embodiment of the invention. At step 402, a chat link such as a link 108 is set up or established between the user of a data processing system or machine, and an agent associated with an online support service or the like. As described above, text analytics are applied to chat transcripts in real time, to infer a goal for a user seeking help in resolving a problem in his machine. As the chat progresses, each line of exchanged text is processed, to determine possible actions that could be automatically or semi-automatically executed on behalf of the user.

To implement this process, FIG. 4 further shows steps 404-418. At step 404, initial messages between the user and agent during the chat are monitored, and analyzed to generate a goal related to the user's problem. At step 406 the goal and the current state of the user's machine are delivered to an AI planner, such as planner 120. The AI planner is operated at step 408, to produce an initial set of actions to achieve the goal.

FIG. 4 further shows a decision step 410 following step 408. At step 410, the AI planner determines whether or not additional information is needed from the user. If not, the method proceeds to step 420, to carry out actions to fix the user's problem. However, if additional information is needed, the agent is directed at step 412 to ask the user specified questions over the chat link, which are related to the needed information. The user's response to these questions is monitored, and analyzed at step 414.

At decision step 416, the AI planner determines whether or not it is necessary to revise the set of actions, in view of the user's response to the specified questions. If not, the method proceeds to step 420. Otherwise, the set of actions is updated, as shown by step 418. The method is then looped back to step 410. Thereafter, one or more iterative cycles involving steps 410-418 are carried out, until decision steps 410 and 416 both produce negative outputs.

Step 420 is followed by decision step 422, which determines whether or not the actions to fix the problem require installation of specified software in the user's machine. If not, the method of FIG. 4 ends. Otherwise, the software is installed at step 424.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for resolving a problem detected in a data processing machine operated by a user, said method comprising the steps of:
    establishing a chat link between the user and an agent associated with a service support system for enabling a conversation between the user and the agent, wherein the conversation comprises successive messages sent over the chat link between the user and the agent;
    analyzing one or more initial messages sent from the user to the agent over the chat link, to generate a goal associated with said detected problem;
    applying the goal and a state of the data processing system as inputs to an artificial intelligence (AI) planning component;
    operating the AI planning component in response to the goal to produce an initial set of actions intended to achieve the goal;
    analyzing messages sent from the user to the agent over the chat link subsequent to the initial messages;
    responsive to said analysis of said subsequent messages, selectively changing the initial set of actions to an updated set of actions, for use in achieving the goal;
    selectively operating said service support system to execute the updated set of actions to achieve the goal, wherein achieving the goal results in resolving the problem detected in the data processing machine; and
    responsive to executing the updated set of actions to achieve that goal, observing state changes in the data processing system during execution of corrective services, and estimate the distance of the machine state from the intended goal.

2. The method of claim 1, wherein:
the updated set of actions includes an action selected from a group that includes at least the actions of automatically installing a patch, a software update, or other specified software component into the software of the data processing machine.

3. The method of claim 1, wherein:
a monitoring engine connected to receive outputs from the AI planning component is operated to monitor and receive successive messages sent between the user and the agent over the chat link.

4. The method of claim 3, wherein:
the AI planning component is operable to direct the agent to ask the user specified questions over the chat link, and the questions asked by the agent and responses of the user thereto are respectively received by the monitoring engine.

5. The method of claim 1, wherein:
said service support system includes a domain knowledge component, for supplying information needed in connection with one or more of said actions, and further includes a services component, for automatically performing a service upon the data processing system in connection with one or more of said actions.

6. The method of claim 1, wherein:
the agent comprises a human agent, or a mechanism which uses a chatbot, selectively.

7. The method of claim 1, wherein:
messages sent between the user and the agent over the chat link respectively comprise text messages.

8. The method of claim 1, wherein:
messages sent between the user and the agent over the chat link respectively comprise human speech in audio form.

9. A computer program product executable in a non-transitory computer readable storage medium for resolving a problem detected in a data processing machine operated by a user, said computer program product comprising:
    instructions for establishing a chat link between the user and an agent associated with a service support system for enabling a conversation between the user and the agent, wherein the conversation comprises successive messages sent over the chat link between the user and the agent;
    instructions for analyzing one or more initial messages sent from the user to the agent over the chat link, to generate a goal associated with said detected problem;
    instructions for applying the goal and a state of the data processing system as inputs to an artificial intelligence (AI) planning component;

instructions for operating the AI planning component in response to the goal to produce an initial set of actions intended to achieve the goal;

instructions for analyzing messages sent from the user to the agent over the chat link subsequent to the initial messages;

instructions responsive to said analysis of said subsequent messages, for selectively changing the initial set of actions to an updated set of actions, for use in achieving the goal;

instructions for selectively operating said service support system to execute the updated set of actions to achieve the goal, wherein achieving the goal results in resolving the problem detected in the data processing machine; and instructions responsive to executing the updated set of actions to achieve that goal, for observing state changes in the data processing system during execution of corrective services, and estimate the distance of the machine state from the intended goal.

10. The computer program product of claim 9, wherein:
said service support system is selectively operated to execute the updated set of actions to achieve the goal, wherein achieving the goal results in resolving the problem detected in the data processing machine.

11. The computer program product of claim 10, wherein:
the updated set of actions includes an action selected from a group that includes at least the actions of automatically installing a patch, a software update, or other specified software component into the software of the data processing machine.

12. The computer program product of claim 9, wherein:
said service support system includes a domain knowledge component, for supplying information needed in connection with one or more of said actions, and further includes a services component, for automatically performing a service upon the data processing system in connection with one or more of said actions.

13. Apparatus for resolving a problem detected in a data processing machine operated by a user, said apparatus comprising:
means for establishing a chat link between the user and an agent associated with a service support system for enabling a conversation between the user and the agent, wherein the conversation comprises successive messages sent over the chat link between the user and the agent;

processor means for analyzing one or more initial messages sent from the user to the agent over the chat link, to generate a goal associated with said detected problem;

processor means for applying the goal and a state of the data processing system as inputs to an artificial intelligence (AI) planning component;

processor means for operating the AI planning component in response to the goal to produce an initial set of actions intended to achieve the goal;

processor means for analyzing messages sent from the user to the agent over the chat link subsequent to the initial messages;

processor means responsive to said analysis of said subsequent messages, for selectively changing the initial set of actions to an updated set of actions, for use in achieving the goal;

processor means for selectively operating said service support system to execute the updated set of actions to achieve the goal, wherein achieving the goal results in resolving the problem detected in the data processing machine; and processor means responsive to executing the updated set of actions to achieve that goal, for observing state changes in the data processing system during execution of corrective services, and estimate the distance of the machine state from the intended goal.

14. The apparatus of claim 13, wherein:
said service support system is selectively operated to execute the updated set of actions to achieve the goal, wherein achieving the goal results in resolving the problem detected in the data processing machine.

15. The apparatus of claim 14, wherein:
the updated set of actions includes an action selected from a group that includes at least the actions of automatically installing a patch, a software update, or other specified software component into the software of the data processing machine.

16. The apparatus of claim 13, wherein:
said service support system includes a domain knowledge component, for supplying information needed in connection with one or more of said actions, and further includes a services component, for automatically performing a service upon the data processing system in connection with one or more of said actions.

* * * * *